J. W. PATTERSON.
HOSE CONNECTION.
APPLICATION FILED JUNE 28, 1920.
1,429,766.
Patented Sept. 19, 1922.
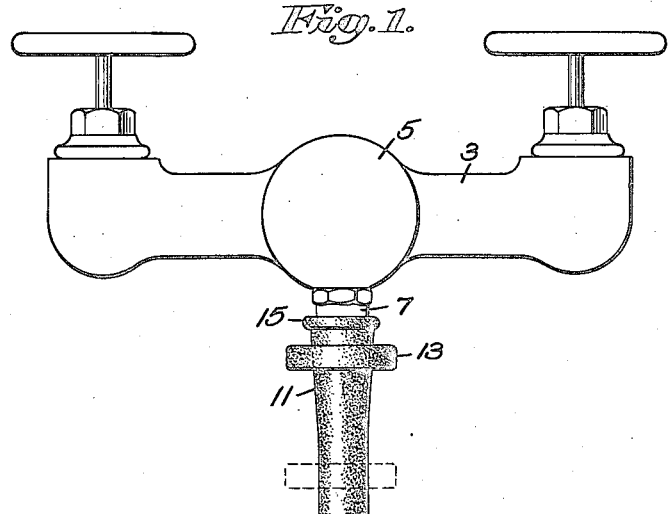
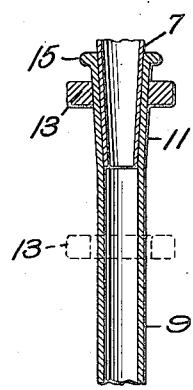
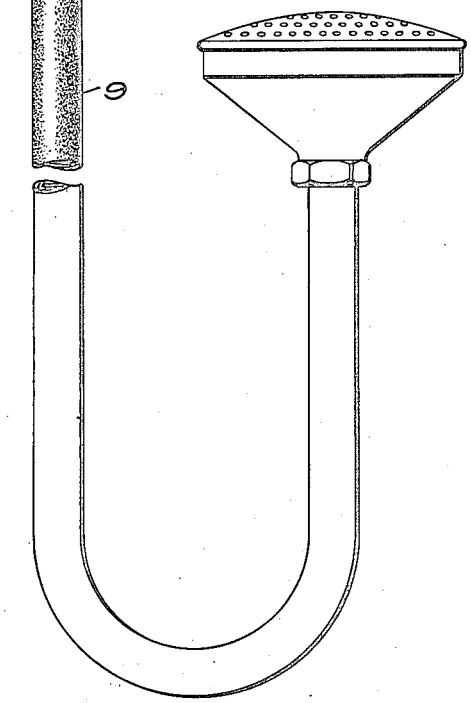
Inventor:
John W. Patterson,
Emery, Booth, Janney + Varney
Attys Patented Sept. 19, 1922.

1,429,766

UNITED STATES PATENT OFFICE.

JOHN W. PATTERSON, OF NEW HAVEN, CONNECTICUT, ASSIGNOR TO THE SEAMLESS RUBBER COMPANY, INC., OF NEW HAVEN, CONNECTICUT, A CORPORATION OF MASSACHUSETTS.

HOSE CONNECTION.

Application filed June 28, 1920. Serial No. 392,210.

*To all whom it may concern:*

Be it known that I, JOHN W. PATTERSON, a citizen of the United States, and a resident of New Haven, county of New Haven, and State of Connecticut, have invented an Improvement in Hose Connections, of which the following description, in connection with the accompanying drawings, is a specification, like characters on the drawings representing like parts.

This invention relates to hose connections and more particularly to a device of this character adapted to secure a flexible hose to another member such as a faucet.

My invention will best be understood by reference to the following description of an illustrative embodiment of my invention shown in the accompanying drawings, wherein:

Fig. 1 is a view of a bath spray attached to a faucet by a connection illustrating my invention; and Fig. 2 is a section through the connection.

Referring to the drawings, I have there shown the common type of bath room faucet 3 having a mixing chamber 5 from which leads the nozzle 7. I have herein shown attached to this nozzle a bath spray which includes a rubber hose 9 at the end of which is the socket 11 adapted to fit over the nozzle 7.

To make a tight joint the socket 11 is compressed about the nozzle 7 and for this purpose I may utilize a ring 13 conveniently of rubber adapted to embrace the socket 11 and constrict the same about the nozzle. Herein the socket has a wall tapered exteriorly from the end thereof and the ring 13, which may embrace loosely the body of the hose 9 as indicated in dotted lines, may be pushed home along this tapered wall until it binds, the ring being somewhat stretched and resiliently compressing the socket about the nozzle and forming a secure water-tight joint. If desired the end of the socket may be provided with a beading 15 so that the ring cannot be accidentally separated from the hose.

My invention provides a convenient and secure means for clamping devices such as bath sprays to faucets. The structure is compact with no loosely dangling parts such as the chains which are commonly used in devices of this character to embrace the faucet connections. The parts may be made entirely of rubber composition or the like as here so that there is no danger of scratching any of the fittings of the tub. Not only is the hose firmly held in place but a water-tight connection is made.

Having described in detail the particular form of my invention here shown for purposes of illustration, what I claim as new and desire to secure by Letters Patent I shall express in the following claims:

1. A hose connection comprising a compressible tapered socket and a freely expansible ring of rubber embracing the same and adapted to be pushed home thereon and to exert by its inherent resiliency a binding action thereon.

2. A hose connection comprising a yieldable rubber socket and a rubber ring closely adapted to said socket and forming by the inherent resiliency of the material an expansible gripping member for resiliently binding said socket to a faucet or like element received therein.

3. An article of manufacture comprising a rubber hose for attachment to a faucet or the like and having its exterior wall of greater diameter adjacent the end to provide a flexible socket portion, said socket portion having a terminal bead, and a thick rubber ring of less internal diameter than the diameter of said bead and fitting loosely the body of the hose adapted to be strained about said socket to bind it to an inserted faucet or the like.

In testimony whereof, I have signed my name to this specification.

JOHN W. PATTERSON.